United States Patent [19]
Ajanovic et al.

[11] Patent Number: 6,145,039
[45] Date of Patent: Nov. 7, 2000

[54] METHOD AND APPARATUS FOR AN IMPROVED INTERFACE BETWEEN COMPUTER COMPONENTS

[75] Inventors: Jasmin Ajanovic, Folsom; David J. Harriman, Sacramento, both of Calif.

[73] Assignee: Intel Corporation, Santa Clara, Calif.

[21] Appl. No.: 09/186,219

[22] Filed: Nov. 3, 1998

[51] Int. Cl.[7] ................................................. G06F 13/10
[52] U.S. Cl. ...................... 710/105; 710/107; 710/129; 710/36; 710/58
[58] Field of Search ............................ 710/36–40, 58–61, 710/1.7–244

[56] References Cited

U.S. PATENT DOCUMENTS

| | | | |
|---|---|---|---|
| 5,191,649 | 3/1993 | Cadambi et al. | 395/200 |
| 5,198,025 | 3/1993 | Hayek et al. | 710/105 |
| 5,469,435 | 11/1995 | Krein et al. | 370/85.2 |
| 5,533,204 | 7/1996 | Tipley | 710/108 |
| 5,553,310 | 9/1996 | Taylor et al. | 395/860 |
| 5,590,292 | 12/1996 | Wooten et al. | 395/825 |
| 5,621,897 | 4/1997 | Boury et al. | 395/296 |
| 5,687,388 | 11/1997 | Wooten et al. | 710/3 |
| 5,761,444 | 6/1998 | Ajanovic et al. | 395/280 |
| 5,802,055 | 9/1998 | Krein et al. | 370/402 |
| 5,832,243 | 11/1998 | Seeman | 395/308 |
| 5,835,739 | 11/1998 | Bell et al. | 395/308 |
| 5,870,567 | 2/1999 | Hausauer et al. | 710/101 |
| 5,881,255 | 3/1999 | Kondo et al. | 395/309 |
| 5,909,594 | 6/1999 | Ross et al. | 710/20 |
| 5,911,052 | 6/1999 | Singhal et al. | 395/293 |
| 5,918,025 | 6/1999 | Hayek et al. | 395/287 |
| 5,930,485 | 7/1999 | Kelly | 395/292 |
| 5,933,612 | 8/1999 | Kelly et al. | 395/306 |
| 5,944,805 | 8/1999 | Ricks et al. | 710/107 |
| 5,978,874 | 11/1999 | Singhal et al. | 710/107 |
| 5,991,824 | 11/1999 | Strand et al. | 710/709 |
| 5,996,036 | 11/1999 | Kelly | 710/110 |
| 6,012,118 | 1/2000 | Jayakumar | 710/126 |
| 6,021,456 | 2/2000 | Herdeg et al. | 710/260 |

*Primary Examiner*—Christopher B. Shin
*Attorney, Agent, or Firm*—Blakely, Sokoloff, Taylor & Zafman LLP

[57] ABSTRACT

An interface to transfer data between a memory controller hub and an input/output (I/O) hub of a chipset within a computer system. One embodiment of the interface includes a bi-directional data signal path and a pair of source synchronous strobe signals. The data signal path transmits data in packets via split transactions. In addition, the packets include a request packet and a completion packet, if necessary. Furthermore, in one embodiment, the request packets include a transaction descriptor.

35 Claims, 10 Drawing Sheets

METHOD AND APPARATUS FOR AN IMPROVED INTERFACE BETWEEN COMPUTER COMPONENTS

FIELD OF INVENTION

The present invention relates to the field of computer systems, and, in particular, the field of providing an improved interface between computer components.

BACKGROUND OF THE INVENTION

Modern computer systems include a Central Processing Units (CPU 101) interconnected to system memory 103 (i.e., the CPU/memory subsystem.) As shown in FIG. 1, data and other signals are transmitted between the CPU and system memory via a component commonly referred to as a host bridge 105. The host bridge 105 may also provide other components and/or subsystems in a computer with an interface to the CPU/memory subsystem.

For example, as further shown in FIG. 1, peripheral components (e.g., a keyboard 109, disk drive 110 and/or mouse 111) may be interconnected to each other via a input/output (I/O) bridge 107. The I/O bridge 107, in turn, may be interconnected with the host bridge 105 to provide an interface between the peripherals and the CPU/memory subsystem.

Additional external busses (e.g., a Peripheral Component Interconnect (PCI) bus 113), however, may also join the interface between the I/O bridge 107 and the CPU/memory subsystem. As a result, the interface between the I/O bridge 107 and CPU/memory subsystem is further complicated and restricted by the specifications/requirements of an external bus 113 (e.g., PCI) which joins the interface between the I/O bridge 107 and the CPU/memory subsystem.

As a result, there is a need for an improved interface between peripheral components and the processor/memory subsystems.

SUMMARY OF THE INVENTION

The present invention provides an interface to transfer data between separate hubs within a computer system, including a data signal path to transmit data between hubs in packets via split transactions. In one embodiment, the data is transmitted in a source synchronous mode. In addition, in one embodiment, the packets for transmitting the data include a request packet and a completion packet, if necessary. Furthermore, in one embodiment, the packets include transaction descriptors.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An improved interface between computer components is described. The interface may be referred to, herein, as a hub link. The hub link is an interface for connecting building blocks of core logic via a narrow and high bandwidth interface.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
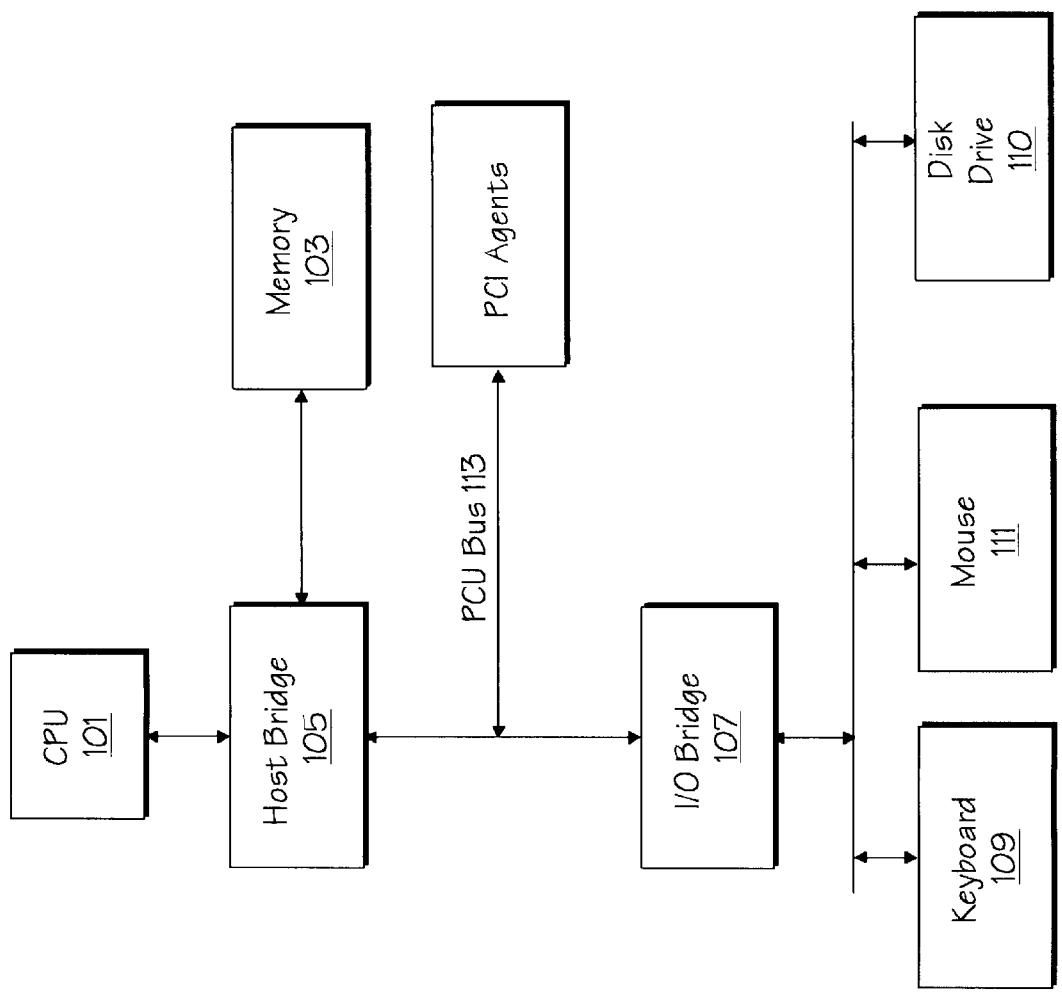
FIG. 1 illustrates a computer system implementing an interface between computer components according to the prior art.
Figure 2:
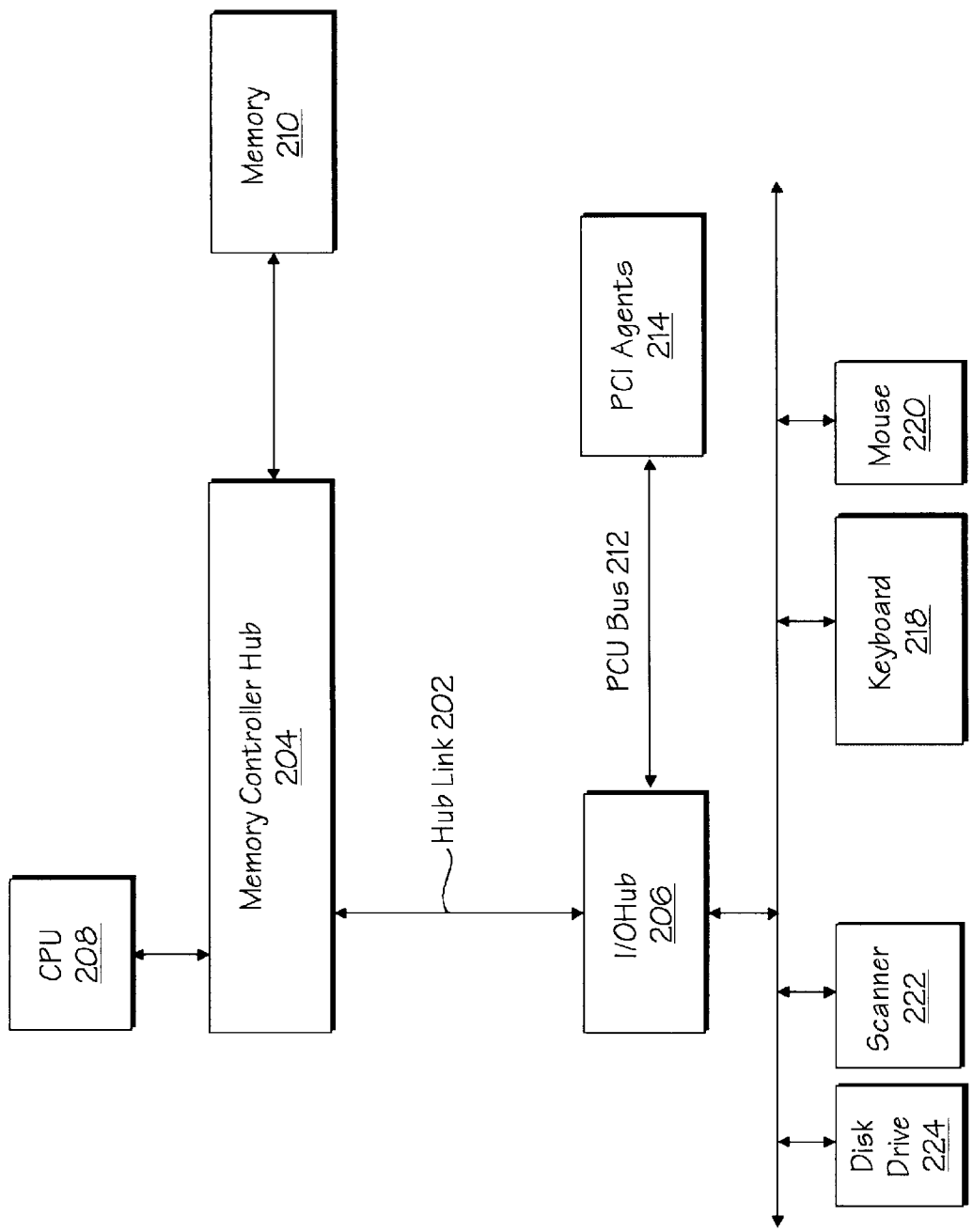
FIG. 2 is a block diagram of one embodiment of a computer system implementing the improved interface between computer components.

As illustrated in FIG. 2, one embodiment of the hub link provides individual components with a point-to-point interface. In alternative embodiments, however, the hub link may provide an interface between three or more components.

More specifically, FIG. 2 illustrates one embodiment of the hub link 204 used to interconnect two separate components (i.e., hub agents) within a chipset. The hub agents provide a central connection between two or more separate buses and/or other types of communication lines.

For example, as further shown in FIG. 2, the chipset includes a memory controller hub 204 (MCH) and an input/output (10) hub 206. The memory controller hub 204, as shown in FIG. 2, provides an interconnection/hub between one or more Central Processing Units 208 (CPU) and the system memory 210.

The I/O hub 206 provides an interconnection between various peripheral components within the system (e.g. a keyboard 218, disk drive 224, scanner 222 and/or mouse 220. ) Moreover, the external busses and their agents (e.g., PCI bus 212 and PCI agents 214), interconnect indirectly with the memory 210 and CPU 208 via the hub link 202, by interconnecting with the I/O hub 206, rather than interconnecting directly with the memory controller hub 204.

By using the hub link to interconnect the memory controller hub 204 and the I/O hub 206, improved access is provided between I/O components and the CPU/memory subsystem (e.g., increased bandwidth, protocol independence, and lower latency.) In addition, the hub link may also improve the scalability of a computer system (e.g., upgrading from a base desktop platform to high-end desktop platforms or workstation platform) by providing a backbone for I/O building blocks.

To provide the improved interface, the hub link includes one or more unique features. In one embodiment, transactions are transferred across the hub link using a packet based split-transaction protocol. For example, a Request Packet is used to start a transaction and a separate Completion Packet may subsequently be used to terminate a transaction, if necessary.

Figure 3:
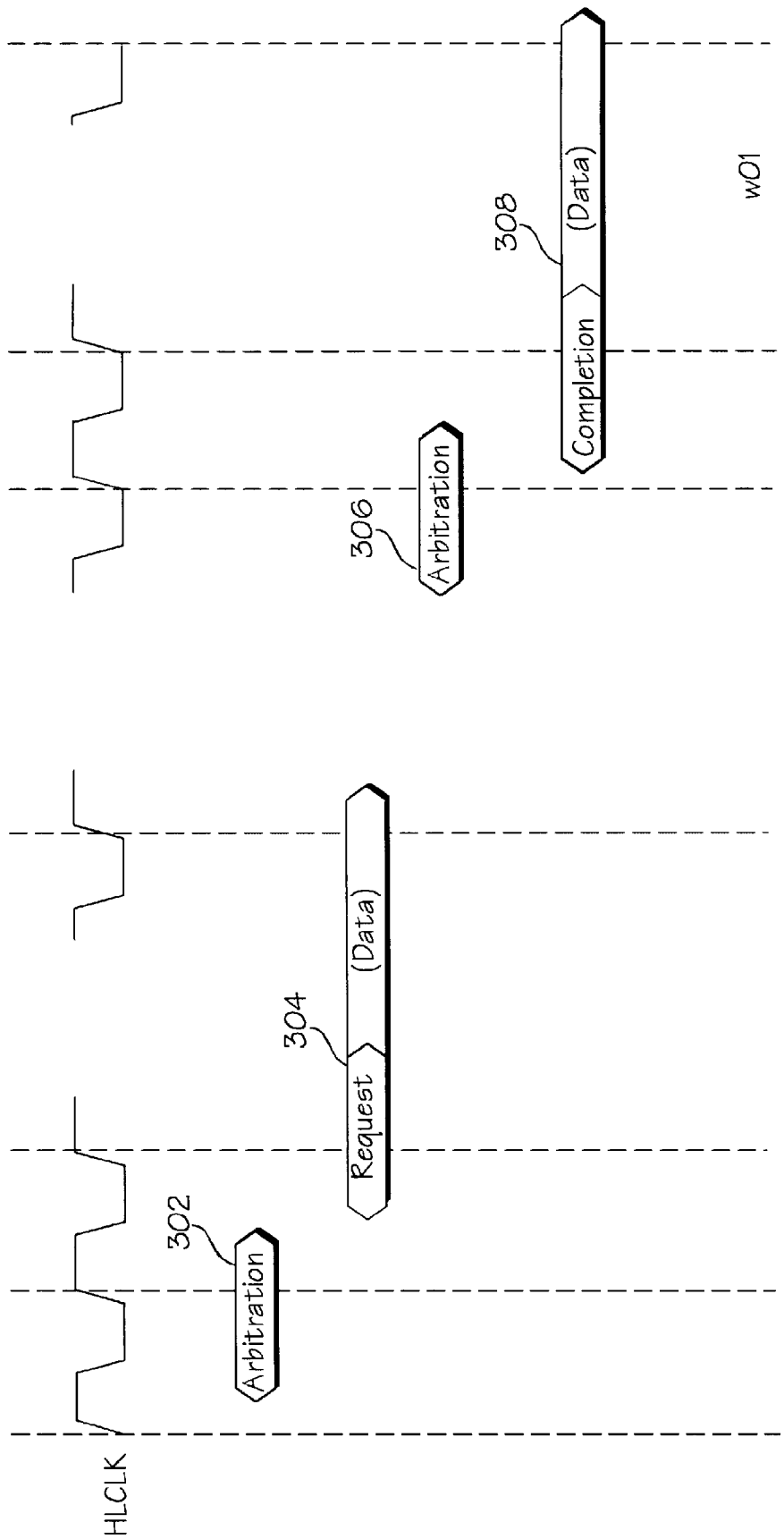
FIG. 3 is a timing diagram illustrating a split transaction implemented by one embodiment of an interface.

FIG. 3 illustrates an example of a split transaction across the hub link. As illustrated in FIG. 3, a hub agent initially obtains ownership of the hub link via arbitration 302. Following the arbitration, there is a request phase 304. If necessary (e.g., in the case of returning data for a read transaction), a completion phase 308 will follow the request phase. Prior to the completion phase, however, the responding hub agent, will first arbitrate 306 for ownership of the hub link.

In between the time of transmitting a request packet and a corresponding completion packet across the hub link, separate unrelated packets may be transmitted across the hub link in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the memory controller hub 204, may be transmitted to the I/O hub 206.

Furthermore, as shown in FIG. 3, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub link uses transaction descriptors for routing of hub link traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub link provides the increased bandwidth despite using a narrow connection (e.g., less pins/pads).

In alternative embodiments, however, a hub link may be implemented with less than all of the unique features as discussed above, without departing from the scope of the invention. Moreover, the hub link could also be used to interconnect bridges and and/or other components within or external to a chipset, without departing from the scope of the present invention.

TRANSACTION, PROTOCOL AND PHYSICAL LAYERS

For greater clarity, the hub link is described in three parts: a transaction layer; a protocol layer; and a physical layer. The distinctions between layers, however, is to be regarded in an illustrative rather than a restrictive sense, and is therefore does not to imply a particular preferred embodiment.

TRANSACTION LAYER

In one embodiment of the hub link, the transaction layer supports the routing of separate transactions transmitted across the hub link (which may consist of one or more packets.) For example, in one embodiment, the transaction layer of the hub link generates transaction descriptors, which are included in the requests and data packets. The transaction descriptors may be used to support arbitration between queues within a hub agent (e.g., MCH), and/or to facilitate routing of requests and data packets through the hub link.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

| Routing Field of Transaction Descriptor | | | | | |
|---|---|---|---|---|---|
| 5 | 4 | 3 | 2 | 1 | 0 |
| Hub ID | | | Pipe ID | | |

As shown in Table 1, three bits of the routing field are used for the Hub ID which identifies the hub agent that initiated the transaction. In alternative embodiments, to provide a hub link hierarchy exceeding 8, additional bits could be used in the routing field.

Figure 4:
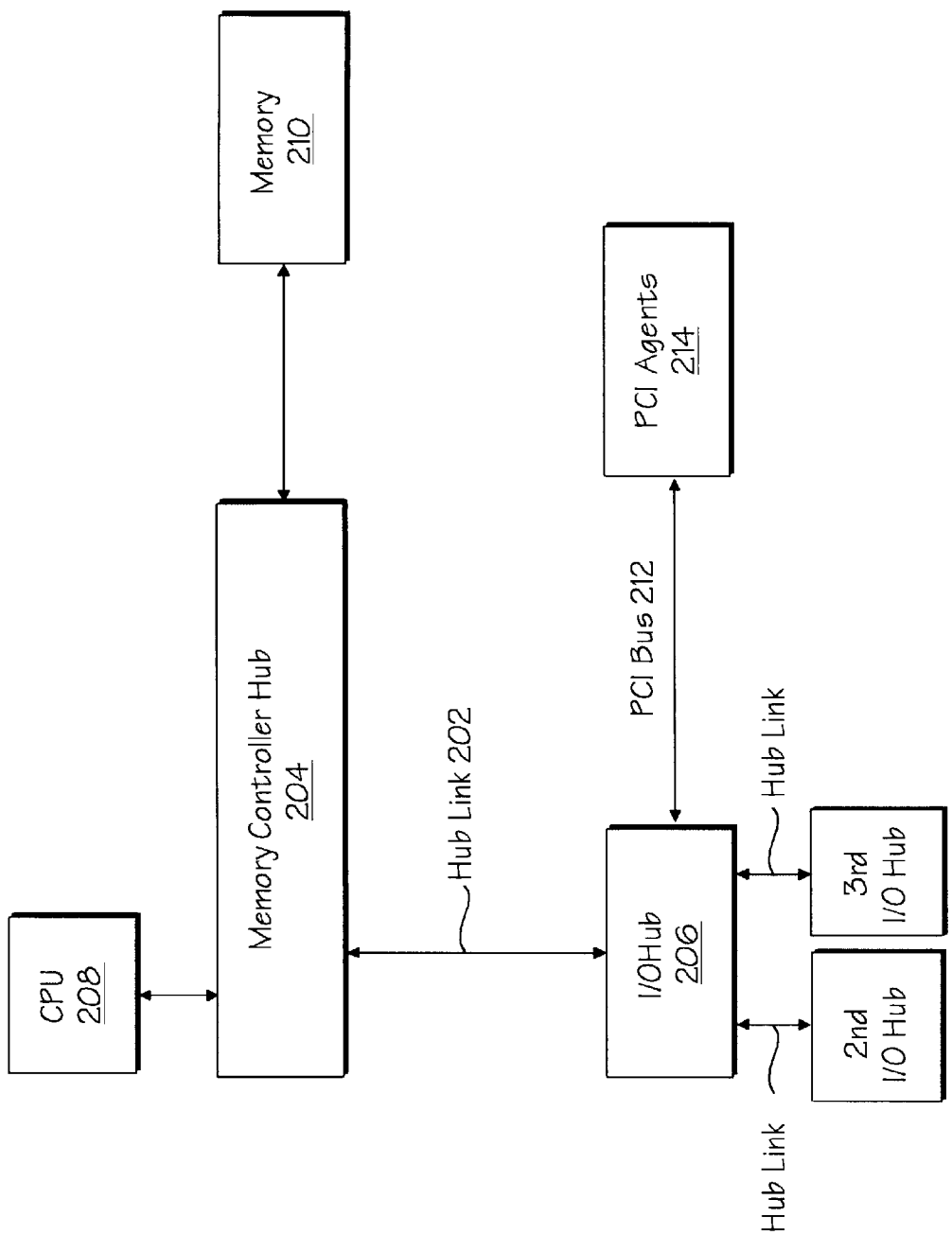
FIG. 4 is a block diagram of one embodiment of a computer system implementing a hierarchy of multiple improved interfaces between computer components.

For example, there may exist multiple hub link hierarchies in a system, in which case the agent at the top of the hierarchies should be capable of routing completions back to the base of the hierarchy. In this context, "hierarchy" consists of multiple connected hub link segments starting from a hub link "root" agent (e.g., a Memory Control Hub.) For instance, FIG. 2 illustrates a system having only one hub link hierarchy. FIG. 4, however, illustrates an example of system based on two hub link hierarchies. In embodiments implementing only one hub link hierarchy, a default value of "000" may be used in the Hub ID field.

The remaining three bits of the routing field may be used to identify internal pipes/queues within a hub link agent. For example the I/O Control Hub may support internal USB (Universal Serial Bus) host controller traffic and Bus Mastering ID (BM-ID) traffic via separate "pipes." As such, the Pipe ID may be used communicate to the servicing agent (e.g., MCH) that traffic initiated by different "pipes" have different attributes, and may be handled in accordance with a predetermined protocol. If a hub link agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub link agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses (e.g., IEEE 1394 and USB.) Such data movement requirements need to be maintained as data flows through the hub link between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub link. For example, in one embodiment, transactions with identical transaction descriptors are executed in strong order (i.e., first come - first serve.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub link interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub link interface, may vary within the scope of the invention. For example, in one embodiment, the hub link implements the ordering rules provided in Peripheral Component Interconnect (PCI) (Revision 2.2) to determine the flow of traffic across the hub link in opposite directions.

PROTOCOL LAYER

In one embodiment, the hub link uses a packet-based protocol with two types of packets: request and completion. A request packet is used for each hub link transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub link interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub link agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub link, data is transferred at a multiple rate (e.g., 1x, 4x, 8x) of the hub link clock (HLCK), which in one embodiment is a common clock shared by the hub agents joined by the hub link. The data is transmitted across a data signal path (PD) of the hub link, which has an "interface width" of some power of two (e.g., 8, 16, 24, 32.) As a result, the hub link may have varying data transfer granularities (i.e., transfer widths), depending upon the transfer rate and the width of the data signal path. For example, in the case of an eight-bit interface width in 4x mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4x mode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

TABLE 2

Byte Transmission Order for 8 and 16 Bit Interface Widths

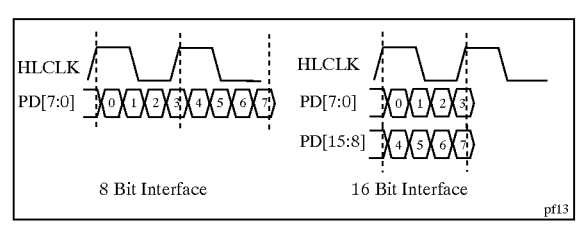

The Protocol Layer of the hub link interface is also responsible for framing the data. As such, the framing rules implemented by the hub link define how to map one or more packet widths onto a set of transfer widths. To simplify the parsing of packets into packet widths, in one embodiment of the hub link, the following three framing rules are implemented: a header section of a packet starts on the first byte of a transfer width; a data section of a packet (if present)

starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub link within the scope of the present invention.

Table 3 and Table 4 set forth below, illustrate examples of the framing rules given above for the case of a 64 bit transfer width.

one double-word, with one additional double-word required for 32 bit addressing, and two additional double-words required for the 64 bit addressing mode. The fields of the headers, as shown in Tables 5 & 6 are described below the tables.

In alternative embodiments of the hub link, the fields included in the header of the request packet may vary without departing from the scope of the invention. For example, the header may include additional field, less fields, or different fields in place of the fields shown below. Moreover, the encoding of the fields may also vary without departing from the scope of the invention.

TABLE 3

Request using 32 Bit Addressing and Containing Three Double-words of Data

| 4th Byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (32b) | | | | Request Header | | | |
| Second DW of Data | | | | First DW of Data | | | |
| {Bogus DW} | | | | Third DW of Data | | | | pf11

TABLE 4

Request using 64 Bit Addressing and Containing Three Double-words of Data

| 4th Byte Transmitted on PD[15:8] Byte 7 | 3rd Byte Transmitted on PD[15:8] Byte 6 | 2nd Byte Transmitted on PD[15:8] Byte 5 | First Byte Transmitted on PD[15:8] Byte 4 | 4th Byte Transmitted on PD[7:0] Byte 3 | 3rd Byte Transmitted on PD[7:0] Byte 2 | 2nd Byte Transmitted on PD[7:0] Byte 1 | First Byte Transmitted on PD[7:0] Byte 0 |
|---|---|---|---|---|---|---|---|
| Address (31:2) | | | | Request Header | | | |
| {Bogus DW} | | | | Address (63:32) | | | |
| Second DW of Data | | | | First DW of Data | | | |
| {Bogus DW} | | | | Third DW of Data | | | | pf12

Request Packets

The packet header format for request packets, according to one embodiment, is shown below in Table 5 and Table 6. In the examples shown in Tables 5 and 6, the base header is

TABLE 5

Request Packet Header Format for 32 bit Addressing

| Last Byte Transmitted | | | | | | | | | | | | First Byte Transmitted | | |
|---|---|---|---|---|---|---|---|---|---|---|---|---|---|---|
| 31 30 29 28 27 26 25 24 | 23 22 21 20 19 18 17 16 | 15 14 13 12 11 10 9 8 | 7 6 5 4 | 3 2 1 0 | | | | | | | | | | |
| rq cp | r/ w | cr | af | lk | Transaction Desc. Routing Field | Re- served | TD Attr | Space | Data Length (DW) | Last DW BE | 1st DW BE | Base |
| Addr[31:2] | | | | | | | | | | | R | ea ct | Address |

TABLE 6

Request Packet Header Format for 64 bit Addressing

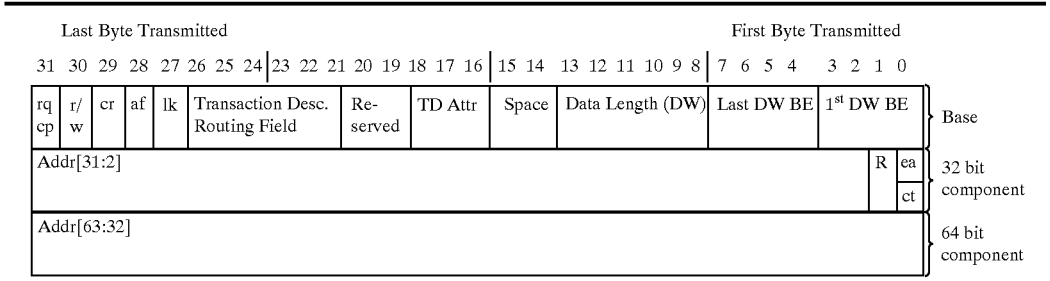

| Field | Description |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO ("01"). |
| 1st DW BE | Byte enables for the first double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

Completion Packets

The header format for a completion packet, according to one embodiment, is shown below in Table 7. In one embodiment, the header is one double-word. The fields of the headers, as shown in Table 8 are described following the table.

In alternative embodiments of the hub link, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

TABLE 7

Completion Packet Header Format

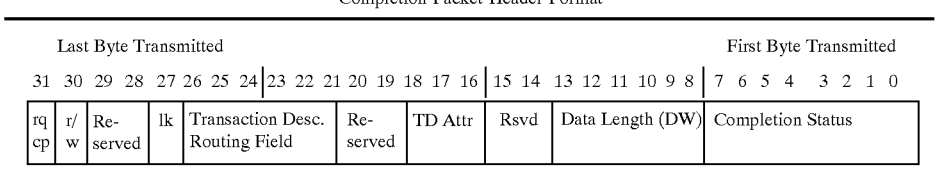

| Field | Description |
|---|---|
| Transaction Descriptor | The Transaction Descriptor Routing and Attribute fields as previously discussed in the Transaction section. |
| rq/cp | Completion packets are identified with a '1' in this location. |

TABLE 7-continued

Completion Packet Header Format

| | |
|---|---|
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. |

In one embodiment of hub link, completions for memory reads may provide less than the full amount of data requested so long as the entire request is eventually completed. Likewise, completions for memory writes may indicate that less than the entire request has been completed. This might be done to satisfy a particular hub link interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with the corresponding request. In the case of multiple completions, the initiator accumulates a count of the data completed for the original request until the original request is fully completed.

Interface Arbitration and Packet Framing

In one embodiment of the hub link interface, when the interface is idle, the assertion of a request from either hub agent connected to the interface, is considered an arbitration event. The first agent to request wins ownership of the interface. If agents request ownership simultaneously when the hub link is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub link agents attached to the same interface. The timeslice counter is started upon acquiring ownership of interface and counts hub link base clock periods.

In one embodiment, each hub agent is responsible for managing its own timeslice allocation. As such, in one embodiment, a timeslice value may be programmed via a hub link command register for each interface in each hub agent.

Figure 5:
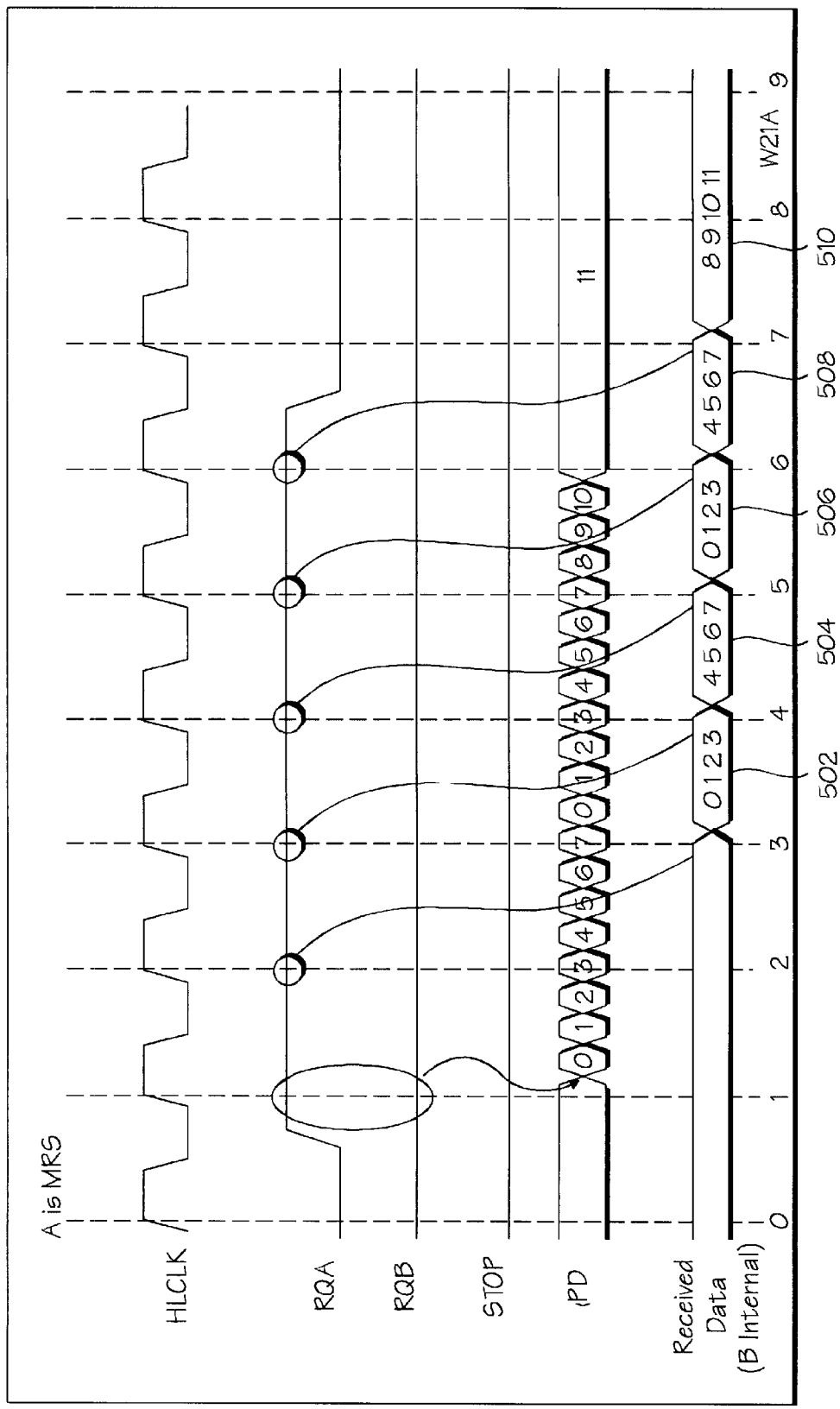
FIG. 5 is a timing diagram illustrating arbitration and transmission of data packets, according to one embodiment.

FIG. 5 illustrates an example of arbitration for the hub link interface between hub agent A and agent B and the transfer of two packets. The example illustrates arbitration out of an idle interface state, with the interface then returning to idle. Moreover, in the example illustrated, the interface is using a 4x data transfer mode with eight bit data signal (PD) path. Agent A, in the example illustrated in FIG. 5, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 502 and 504 and requires two base clocks to transmit in the 4xmode. The second packet is three double-words 506, 508, and 510, and so requires three base clocks in the 4xmode.

Flow Control

In one embodiment, packets may be retried or disconnected by a receiving agent due to lack of request queue space, data buffer space, or for other reasons. In one embodiment, Plow control is accomplished using a STOP signal.

Figure 6:
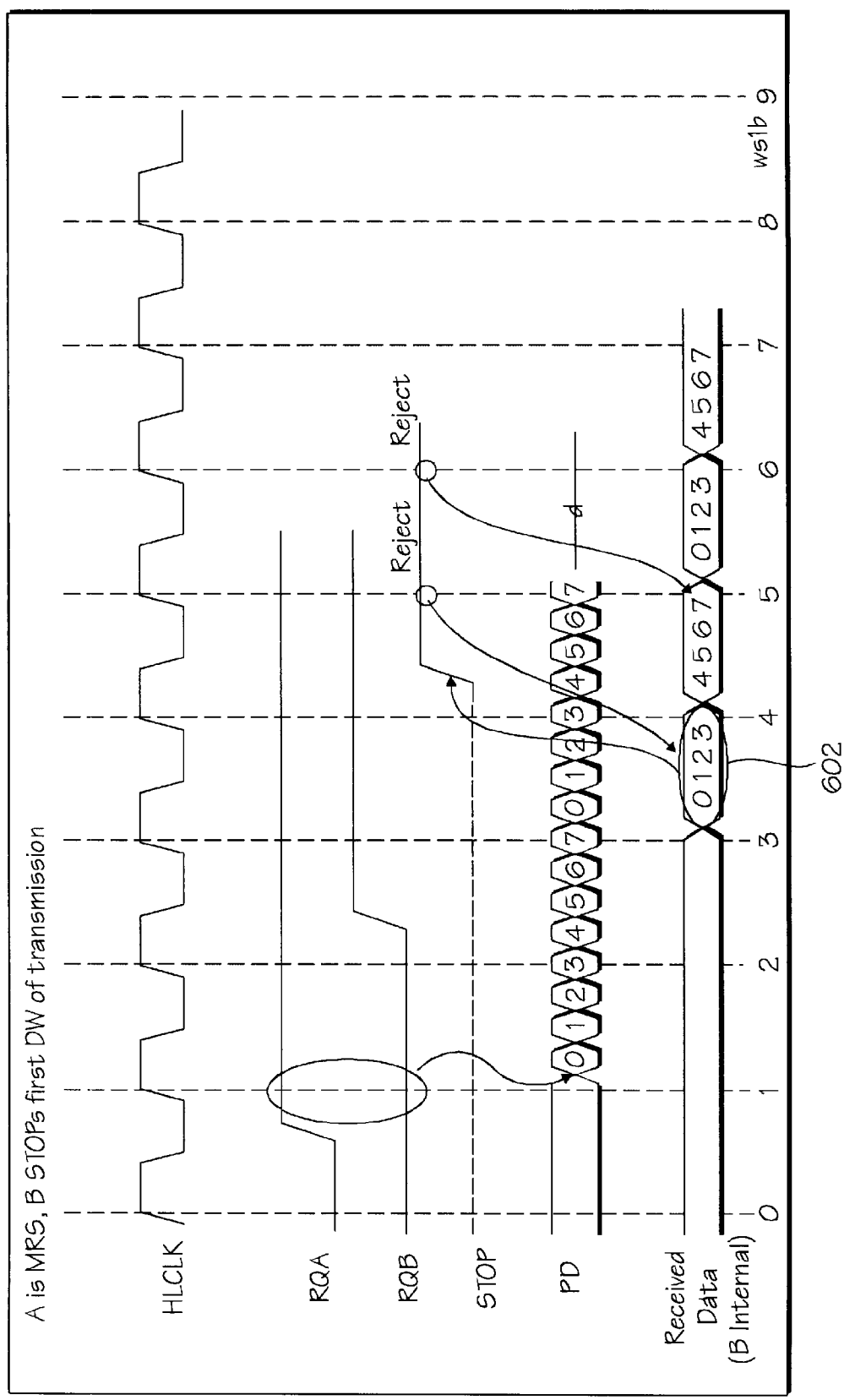
FIG. 6 is a timing diagram illustrating flow control of data packets, according to one embodiment.

FIG. 6 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 6, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4x mode (using an eight bit wide PD signal), the STOP signal is sampled each base clock. However, for a 1xmode, the STOP signal is sampled each fourth clock (with the beginning of a transaction being used as a reference point).

Figure 7:
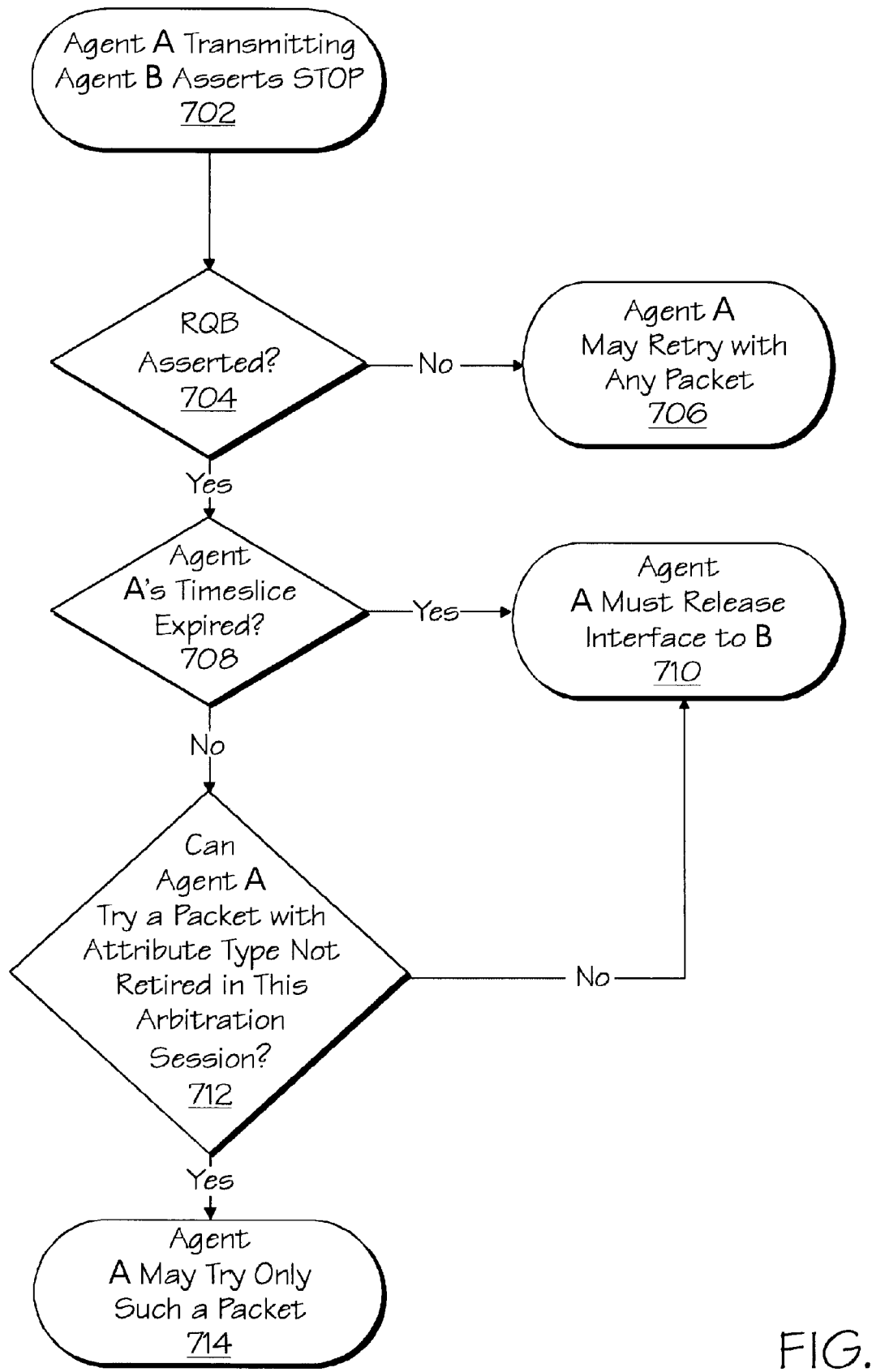
FIG. 7 illustrates a flow diagram describing the steps of responding to flow control operations according to one embodiment.

Following the reception of a STOP signal, the hub agent that receives the STOP signal determines whether it may retry sending additional packets. FIG. 7 is a flow diagram describing the steps performed by a hub agent in determining whether it may retry sending a packet following receipt of a STOP signal, according to one embodiment.

In step 702, a hub agent that is currently transmitting packets receives a STOP signal. In response, in step 704 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 706 the current owner of the interface may attempt to transmit a packet following recovery from the STOP. On the other hand, if it is determined that the agent which activated the STOP signal is requesting ownership, in step 708, the current owner determines if its timeslice has expired.

If the timeslice for the current owner of the interface has expired, in step 710, the current owner releases ownership. If the timeslice for the current owner has not expired, the current owner may transmit a packet with an attribute that is different from the interrupted packet. More specifically, in step 712, the current owner determines if it has a packet with a attribute type that is different from any packets that have been retried in the present arbitration session (i.e., the period of the current owner's tenure), which needs to be transmitted.

If the current owner does have a packet with a different attribute, in step 714 the current owner may attempt to transmit the packet. Otherwise, the current owner release ownership of the interface.

PHYSICAL INTERFACE

In one embodiment, the hub link interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4x of the base hub link clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub link interface supports a voltage operation of 1.8 V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 8:
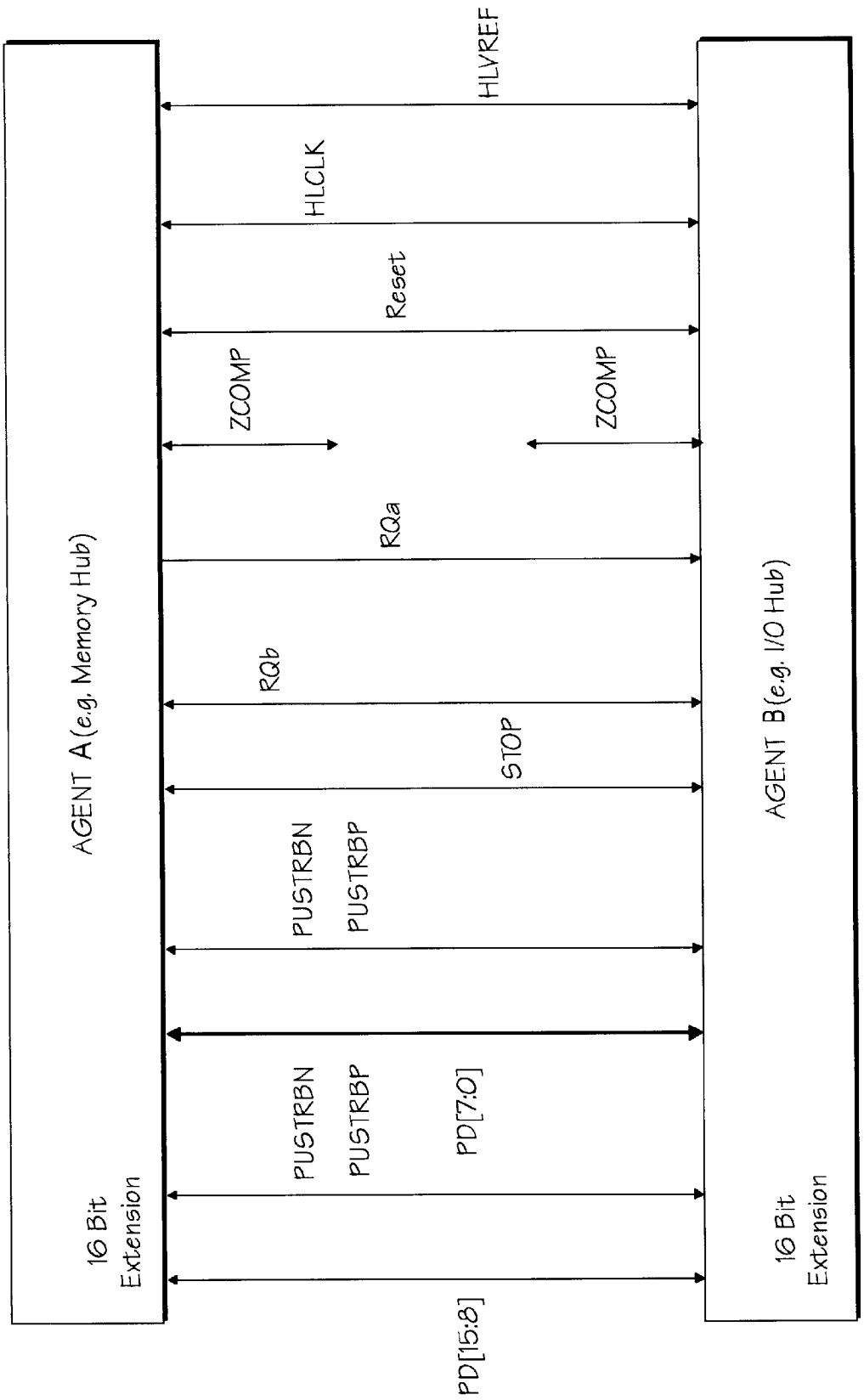
FIG. 8 illustrates the physical signal interface according to one embodiment.

FIG. 8 illustrates the physical signal interface of the hub link between two hub agents, according to one embodiment. As shown in FIG. 8, the hub link physical interface uses a bidirectional eight bit data bus (PD [7:0]) with a differential pair of source synchronous strobe signals (PSTRBN, PSTRBP) for data clocking. In an alternative embodiment, the interface can widened. For example, as shown in FIG. 8, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQa, RQb), and a bidirectional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations, are also included.

The physical signals shown in the interface illustrated in FIG. 8 are further described below in Table 8. In alternative embodiments of the hub link, the signals included in the physical interface may vary without departing from the scope of the invention. For example, the physical interface may include more, less or different signals varying from the signals shown in FIG. 8 and further described below in Table 8.

TABLE 8

Hub Link Interface Signals for Eight Bit Agents

| Name | Bits (Pads) | Type | Clock Mode | Description |
|---|---|---|---|---|
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above. |
| RQa | 1 | I/O | CC[3] | Active-high request from agent A (output from A, input to B) to obtain ownership of the hub link interface. RQa is asserted when agent A has data available available to send, and is de-asserted when either all of agent A's data has been sent or agent A determines that it should release the interface. Reset voltage value is VSSHL. |
| RQb | 1 | I/O | CC | Request from agent B (output from B, input to A). See above description of RQa. |
| STOP | 1 | ASTS | CC | Used for pipelined flow control to retry or disconnect packets. |
| HLCLK | 1 | I | N/A | hub link base clock, in one embodiment, either 66 MHz or 100 MHz. This provides timing information for the common clock signals (described further below. |
| RESET# | 1 | I | CC | Active-low reset indication to hub link agents.[4] |
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal

TABLE 8-continued

Hub Link Interface Signals for Eight Bit Agents

| Name | Bits (Pads) | Type | Clock Mode | Description |
|---|---|---|---|---|

[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub link interface are transmitted in accordance with a common clock mode. More specifically, the timing of the signals that are transmitted via the common clock mode are referenced to a single clock (e.g., the hub link clock.) In alternative embodiments, the signals may be tied to a system clock, exterior to the hub link agents. Moreover, there may be more than one hub link segment in a system, in which case different base clocks may be used for the different segments. For example, one component might implement both a 66 MHz base hub link interface and a 100 MHz base hub link interface.

Source Synchronous Transfer Mode Operation

In one embodiment, the packets/data are transmitted using a source synchronous clock mode, which provides a technique for multiplying the data transfer rate of data. For example, in an embodiment using 4x source synchronous clocking mode with an eight bit data signal path, transmitting a double-word (i.e., four bytes) requires only one hub link clock cycle (HLCK.) Alternatively, transmitting a double-word using 1x source synchronous clocking mode on an eight bit data signal path would require four hub link clock cycles to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used by the receiving hub agent to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 9, in one embodiment a first data transfer corresponds to the rising edge of PSTRBP and the falling edge of PSTRBN. A second data transfer corresponds to the rising edge of PSTRBN and the falling edge of PSTRBP.

Figure 9:
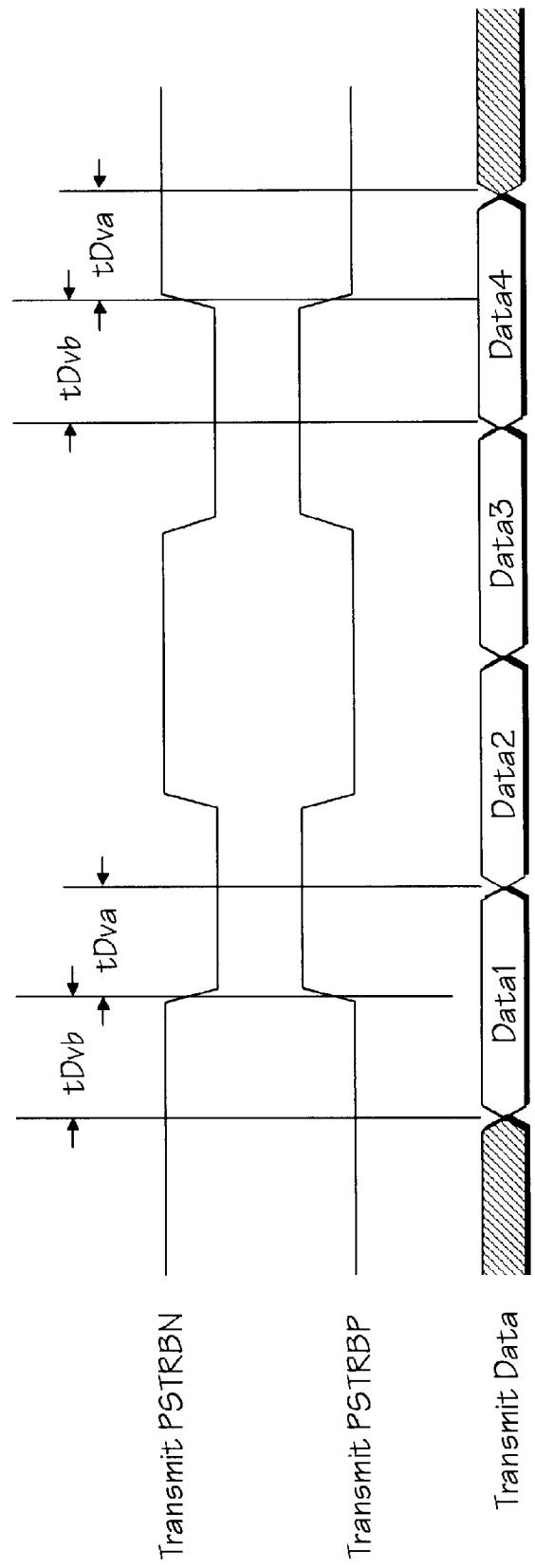
FIG. 9 is a timing diagram illustrating source synchronous clocking according to one embodiment.

In addition, in one embodiment, as further shown in FIG. 9, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub link clock (HLCK) before being passed along within the receiving hub agent.

Figure 10:
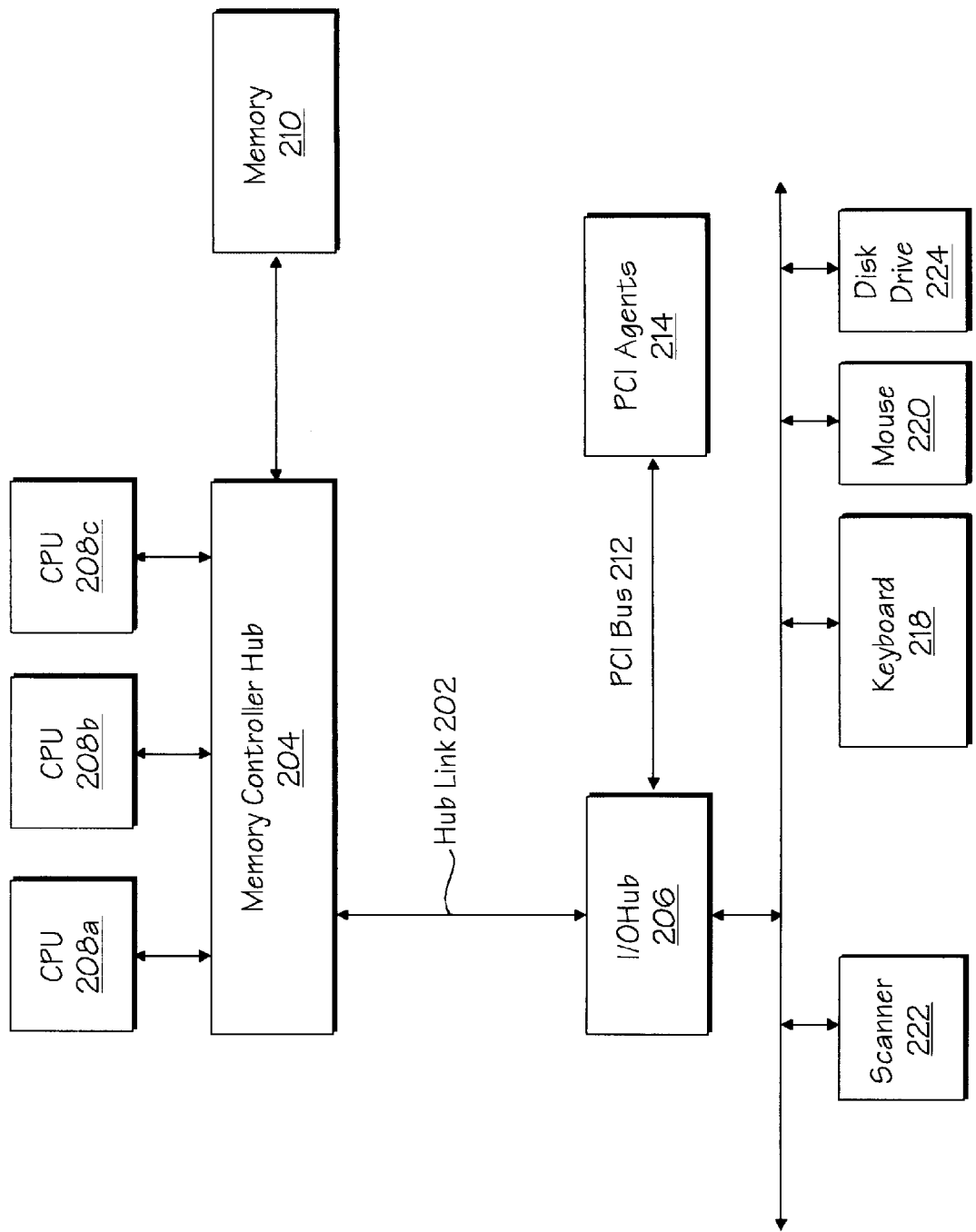
FIG. 10 illustrates a computer system having multiple processors implementing an improved interface between computer components according to one embodiment.

In the foregoing specification the invention has been described with reference to specific exemplary embodiments thereof. It will, however, be evident that various modifications and changes may be made thereto without departing from the broader spirit and scope of the invention. For example, the hub link interface, according to one embodiment, may be implemented in a computer system having multiple processors, as illustrated in FIG. 10. The specification and drawings are, as a result, to be regarded in an illustrative rather than a restrictive sense.

What is claimed is:

1. An interface to transfer data directly between a first hub and a second hub within a computer system, comprising:
   a data signal path to transmit data in packets via split transactions; and
   a set of command signals, wherein said interface provides a point-to-point connection between said first hub and said second hub, exclusive of an external bus connected directly to the interface.

2. The interface of claim 1, wherein said first and second hubs within said computer system are components within a chipset.

3. An interface to transfer data between a first hub and a second hub within a computer system, comprising:
   a set of data signals and a pair of source synchronous strobe signals, said data signals transmit data in packets via split transactions, said packets including a request packet and completion packet, said request packet including a transaction descriptor; and
   a set of command signals including unidirectional arbitration signal and a common clock signal, wherein said interface provides a point-to-point connection between said first hub and said second hub, exclusive of an external bus connected directly to the point-to-point connection.

4. The interface of claim 1, wherein a first transaction is initiated on said interface with a request packet, subsequent to arbitration for ownership of said interface.

5. The interface of claim 4, wherein said request packet includes a transaction descriptor.

6. The interface of claim 4, wherein a completion packet is transmitted on said interface in response to said request packet of said first transaction.

7. The interface of claim 5, wherein said request packet includes a transaction descriptor and said completion packet includes a corresponding transaction descriptor.

8. The interface of claim 6, wherein a request packet for a second transaction can be transmitted across said interface prior to transmitting said completion packet in response to the request packet of said first transaction.

9. The interface of claim 8, wherein said first is a memory controller hub to interconnect a processor and a memory device.

10. The interface of claim 9, wherein a second hub is an input/output (I/O) hub to interconnect peripheral components within a computer system.

11. The interface of claim 1, wherein said data signal path is scalable.

12. The interface of claim 11, wherein packets are transmitted across said data signal path via a source synchronous clock mode.

13. The interface of claim 12, wherein said interface includes a set of bi-directional data signals, a first and second source synchronous strobe signal, a unidirectional arbitration signal, and a bidirectional stop signal.

14. The interface of claim 13, wherein said interface further includes a system reset signal, a common clock signal, and a voltage reference signal.

15. The interface of claim 7, wherein said transaction descriptors identify separate hubs within a hierarchy of multiple interfaces between at least three hubs.

16. The interface of claim 6, wherein said request packet includes a field indicating if a completion packet is required in response to the respective request packet.

17. The interface of claim 4, wherein arbitration between said hubs is symmetric and distributed.

18. The interface of claim 4, wherein a hub is allotted ownership of said interface up to a predetermined amount of time.

19. An interface to transfer data directly between a first hub and a second hub within a computer system, comprising:
- a first means for transmitting data between said first hub and said second hub in packets via split transactions; and
- a second means for transmitting command signals, wherein said interface provides a point-to-point connection between said first hub and said second hub, exclusive of an external bus connected directly to the interface.

20. The interface of claim 19, wherein said first and second hubs within said computer system are components within a chipset.

21. An interface to transfer data between a memory controller hub and an input/output (I/O) hub of a chipset within a computer system, comprising:
- a bi-directional data signal path and a pair of source synchronous strobe signals, said data signal path transmits data in packets via split transactions, said packets including a request packet and completion packet, said request packet including a transaction descriptor; and
- a set of command signals including unidirectional arbitration signal, a bi-directional stop signal, a system reset signal, a common clock signal, and a voltage reference signal.

22. The interface of claim 19, wherein said interface includes a means for initiating a first transaction on said interface with a request packet.

23. The interface of claim 22, wherein said request packet includes a transaction descriptor.

24. The interface of claim 22, wherein said interface includes means for providing a completion packet in response to said request packet of said first transaction.

25. The interface of claim 23, wherein said request packet includes a transaction descriptor and said completion packet includes a corresponding transaction descriptor.

26. The interface of claim 24, wherein said interface includes a means for transmitting request packet for a second transaction across said interface prior to transmitting said completion packet in response to the request packet of said first transaction.

27. The interface of claim 26, wherein said first hub is a memory controller hub having a means to interconnect a processor and a memory device.

28. The interface of claim 27, wherein said second hub is an input/output (I/O) hub having a means to interconnect peripheral components within a computer system.

29. The interface of claim 19, wherein said first means for transmitting data in packets via split transactions includes further includes means for scaling a data signal path.

30. The interface of claim 26, wherein said interface includes means for transmitting packets across said interface via a source synchronous clock mode.

31. The interface of claim 25, wherein said transaction descriptors include a means for identifying separate hubs within a hierarchy of multiple interfaces between three or more hubs.

32. The interface of claim 24, wherein said request packet includes a means for indicating if a completion packet is required in response to the respective request packet.

33. The interface of claim 32, wherein interface includes a means for arbitrating between said hubs for ownership of said interface.

34. The interface of claim 22, wherein said interface further includes a means for is allotting ownership of said interface to one of said hubs up to a predetermined amount of time.

35. The interface of claim 21, wherein said interface provides a point-to-point connection between said first hub and said second hub, exclusive of an external bus connected directly to the point-to-point connection.

* * * * *

UNITED STATES PATENT AND TRADEMARK OFFICE
CERTIFICATE OF CORRECTION

PATENT NO.   : 6,145,039
DATED        : November 7, 2000
INVENTOR(S)  : Ajanovic et al.

It is certified that error appears in the above-identified patent and that said Letters Patent is hereby corrected as shown below:

Column 2,
Line 39, after "input/output", delete "(10)", insert -- (IO) --.

Column 12,
Line 33, delete "Plow", insert -- Flow --.

Signed and Sealed this

Sixth Day of August, 2002

Attest:

Attesting Officer

JAMES E. ROGAN
Director of the United States Patent and Trademark Office